United States Patent [19]

Kusayama

[11] Patent Number: 4,842,799
[45] Date of Patent: Jun. 27, 1989

[54] METHOD FOR INJECTION MOLDING END STOPS ON SLIDE FASTENER

[75] Inventor: Masahiro Kusayama, Kurobe, Japan
[73] Assignee: Yoshida Kogyo K. K., Tokyo, Japan
[21] Appl. No.: 34,931
[22] Filed: Apr. 6, 1987
[30] Foreign Application Priority Data Apr. 7, 1986 [JP] Japan .................................. 61-79571

[51] Int. Cl.⁴ ......................... C29C 45/14; B29D 5/00
[52] U.S. Cl. .................................... 264/265; 264/252;
264/266; 264/275; 264/277; 264/279
[58] Field of Search ...................... 264/252, 263, 271.1,
264/275, 279, 265, 266, 277; 425/814, DIG. 34;
29/408, 33.2, 767

[56] References Cited
FOREIGN PATENT DOCUMENTS 2012573 9/1971 Fed. Rep. of Germany ........ 29/408

Primary Examiner—Hubert Lorin

[57] ABSTRACT

A method of applying end stop members by injection molding to a slide fastener having rows of coupling elements on opposed stringer tape edges, a predetermined length of each of these tape edges being held upright or substantially vertical to the plane of the tape web and embraced by end stops molded in place with that predetermined length of tape edges maintaining alignment with its neighboring contiguous tape edge outside the molded end stop.

1 Claim, 6 Drawing Sheets

METHOD FOR INJECTION MOLDING END STOPS ON SLIDE FASTENER

BACKGROUND OF THE INVENTION

1. Field of the Invention:

This invention relates to a method of applying injection-molded end stop members to slide fasteners and an apparatus for carrying this method into practice.

2. Description of the Prior Art:

Fluidtight, i.e. airtight or watertight, slide fasteners are known, as the name implies, for their capability of sealing against leakage under various enviromental conditions. The seal is effected along confronting longitudinal edges of two opposed stringer tapes when they are brought into abutting relation to each other by a slider member. To this end, the longitudinal tape edge is beaded or folded on one side upon which is mounted a row of coupling elements typically of a discrete formation, each element being covered by a sealing strip. The folded tape edge must be spaced a sufficient distance apart from the upper surface of the tape web such that the slider can move smoothly along and couple or uncouple the opposed fastener stringers. Therefore, the tape edges are, particularly in uncoupled condition, unstably movable with respect to the plane of the fastener, but are required in coupled condition to assume substantially upright position. When applying end stops as by injection-molding to such tape edges at the top or bottom end portion of the tape, care must be taken so that the lengths of the tape edges to which the end stops are applied maintain such upright position throughout the injection-molding operation to ensure alignment with ensuing contiguous lengths of exposed tape edges. Failing this would result in warped or displaced coupling elements that neighbor the end stops, thus eventuating in a malfunctioned or defective slide fastener.

SUMMARY OF THE INVENTION

With the foregoing difficulties in view, the present invention provides a method of and apparatus for applying end stop members for slide fasteners by injection molding which will enable the end stop to be molded in place over a predetermined length of element-carrying tape edges while the latter are maintained in proper upright position and in alignment with contiguous neighboring coupling elements.

According to the method and apparatus of the invention, a predetermined length of each of opposed tape edges carrying thereon rows of coupling elements is supported in a position substantially vertical to the plane of the tape web, and an end stop is applied by injection molding to embrace said predetermined length of tape edges, the flow of end stop material being directed toward the direction in which said tape edges are supported.

Many other advantages, features and additional objects of the present invention will become manifest to those versed in the art upon making reference to the detailed description and the accompanying drawings in which two preferred embodiments incorporating the principles of the present invention are shown by way of illustrative example, in which like reference numerals refer to like or corresponding parts throughout the several views.

DETAILED DESCRIPTION OF THE PREFERRED EMBODIMENTS

Figure 1:
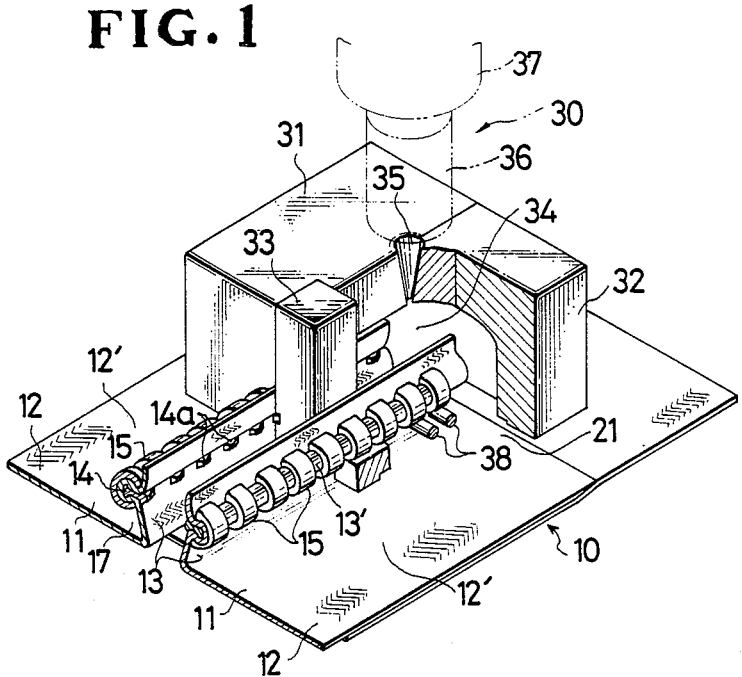
FIG. 1 is a fragmentary perspective view of a pair of fluidtight fastener stringers to which a top end stop is being applied according to the invention.

Refering now to the drawings and FI. 1 in particular, there is shown a portion of each of a pair of identical stringers constituting a slide fastener 10 which is suitable for fluidtight applications. Since the stringers are identical in form and construction, it should suffice here to describe one of them. The stringer designated at 11 comprises a support tape 12 carrying on and along its inner longitudinal edge 13 a row of coupling elements 14 which is illustrated in the present embodiment to be of a discrete formation. Each individual element 14 has a coupling head portion 14a engageable with the corresponding head on the mating or opposite tape 12 and a heel portion 14b disposed remote from the head 14a and covered by a sealing clamp 15. The tape edge 13 to which the row of coupling elements 14 is secured is folded to provide a sealing abutment 16 with the opposite tape edge 13 to establish a seal against leakage in a manner well known in the art. As is also known, the tape edges 13 are raised with the coupling elements 14 above the surface of the web of the tape 12 to provide a clearance 17 for the passage of a slider 18 shown in FIG. 2.

The slider 18 is conventional in that it has a slider body 19 defining therein a guide channel (not shown) for the passage therethrough for the opposed rows of coupling elements 14 to come into or out of engagement with each other, and it has a pull tab 20 with which to manipulate the slider 18. The movement of the slider 18 is limited or stopped at the top end 21 of the stringer 11 by an end stop 22, as better shown in FIGS. 2 and 3, which is applied by injection molding in accordance with the invention.

It is important for reasons set out above that the end stop 22 is molded in place over a predetermined length of tape edges 13 including coupling elements 14 while that length is maintained in upright position relative to the plane of the tape web 12' and in alignment with the contiguous, neighboring row of elements 14.

Figure 2:
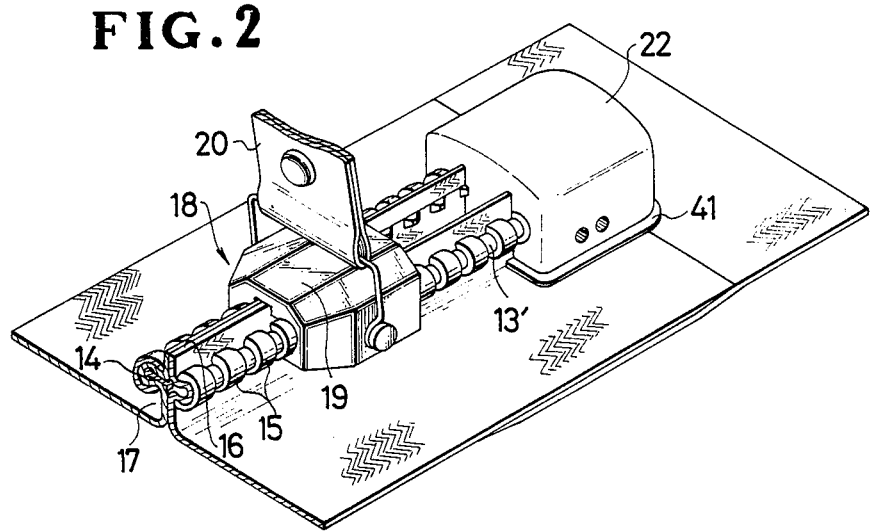
FIG. 2 is a view simlar to FIG. 1 but illustrating the stringers to which the end stop has been applied.
Figure 3:
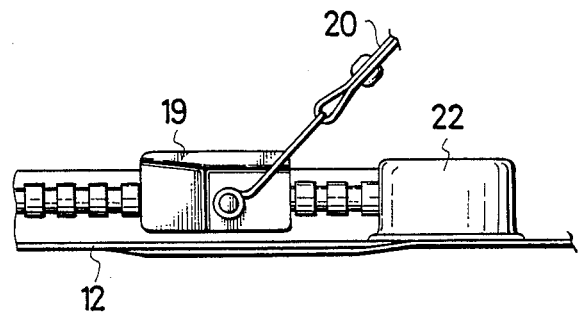
FIG. 3 is a side elevation of FIG. 2.
Figure 4:
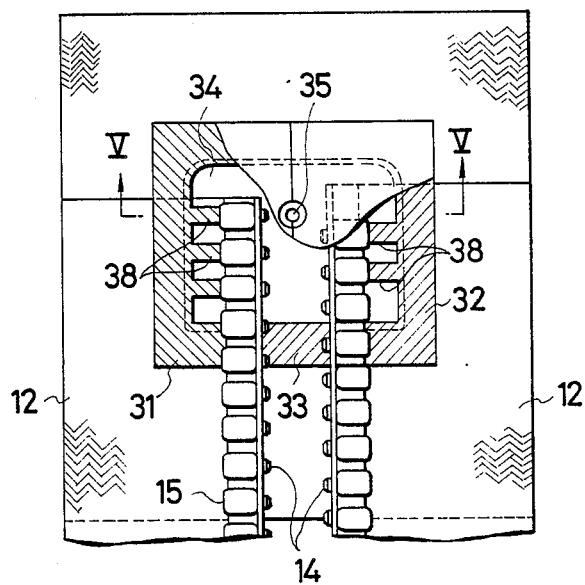
FIG. 4 is a plan view, partly sectional, of FIG. 1.
Figure 5A:
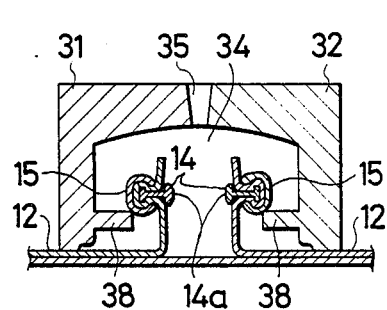
FIGS. 5a, 5b and 5c are cross-sectional views taken on the line V—V utilized to explain the steps of applying an end stop by injection molding.
Figure 5B:
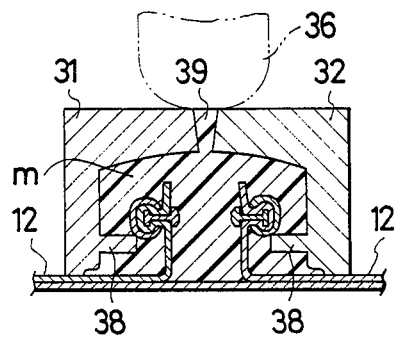
Figure 5C:
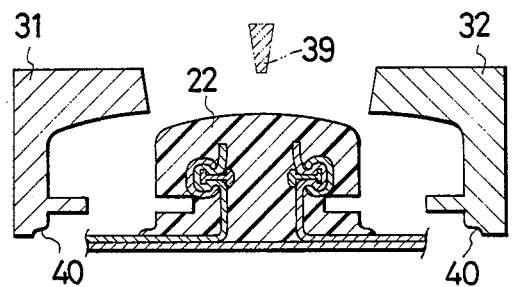

To this end, according to the method of the invention, a predetermined length of a tape edge 13 carrying a row of coupling elements 14 is supported in a position substantially vertical to the plane of the tape web 12' as shown in FIG. 5a; an end stop forming material is injected to flow in a direction opposite to the position in which the tape edge 13 is supported as shown in FIG. 5b; and an end stop 22 in molded in place as shown in FIG. 5c and FIG. 2 with that predetermined length of tape edge 13 maintaining alignment with its neighboring contiguous tape edge 13' (FIG. 2) outside the end stop 22.

Apparatus employed to carry this method into practice is schematically shown in FIG. 1 and generally designated by 30 which comprises a pair of first and second molds 31, 32 horizontally movable toward and away from each other and a spacer block mold 33 separating the opposed tape edges 13, the molds 31, 32 and 33 defining therein a molding chamber 34. An opening 35 is provided centrally between the two molds 31 and 32 communicating with the chamber 34 for introducing thereinto a molding material M from a nozzle 36 connected to an injection cylinder 37.

Each of the molds 31, 32 has a plurality of support pins 38 spaced apart a distance corresponding to the pitch of the elements 14 and extending into the chamber 34 in spaced parallel relation to the plane of the tape web 11'. The pins 38 are adapted to support the clamped heel portion 14b of each of the coupling elements 14 so that the length of the tape edge 13 to be molded together with the end stop 22 is maintained during molding of the latter in upright position as desired. The opening 35 is located in a position such that the material M flows from above in a direction opposite to the position of the support pins 38, orienting the flow not to affect the support of the tape edges 13.

Upon completion of the molding operation, the first and second molds 31, 32 are separated as shown in FIG. 5c with a residual gate 39 removed. To facilitate removal of this gate 39, the opening 35 is tapered toward the chamber 34, or conically formed as shown in FIG. 1.

Figure 6:
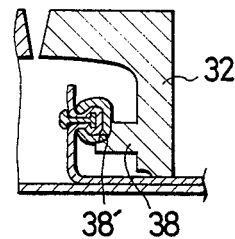
FIG. 6 is a fragmentary sectional view of one of a pair of stringers, showing a modified supporting means.

To ensure stronger support for the tape edges 13 to be molded, the support pin 38 may be made larger and further provided with a recess 38' for stably receiving the heel portion 14b of the element 14, as shown in FIG. 6.

Figure 7:
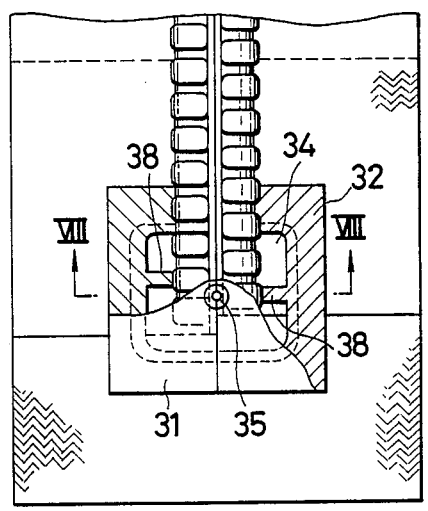
FIG. 7 is a plan view, partly sectional, of a bottom end portion of a fluid-tight slide fastener to which an end stop is applied.
Figure 8A:
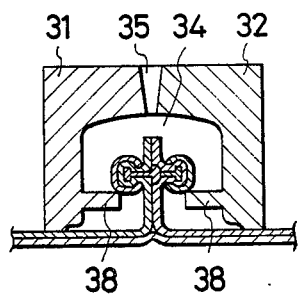
FIGS. 8a and 8b are cross-sectional views taken on the line VIII—VIII of FIG. 7 and utilized to explain the molding operation.
Figure 8B:
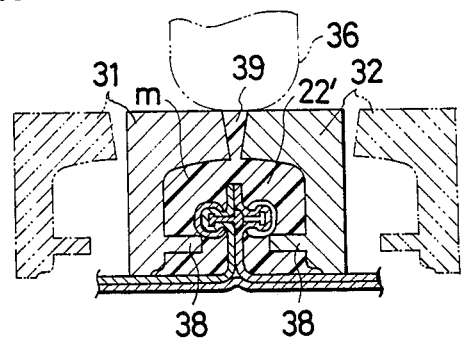
Figure 9:
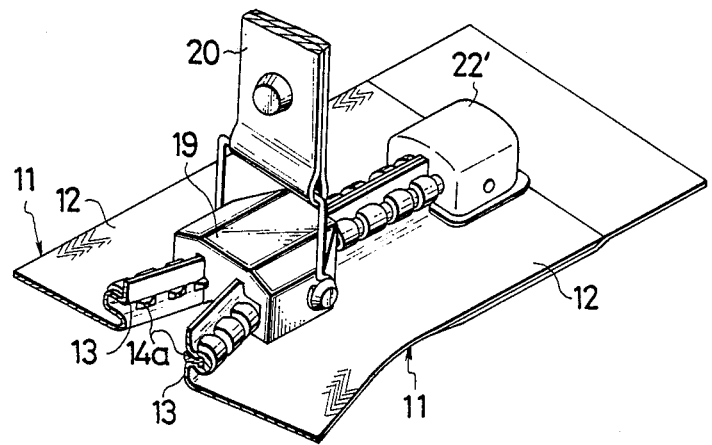
FIG. 9 is a fragmentary perspective view of a bottom end portion of the fluid-tight slide fastener to which an end stop has been molded in place.

FIGS. 7, 8a and 8b inclusive show an apparatus for molding a bottom end stop 22' (FIG. 9) onto the fastener 10, the apparatus being the same as that in FIG. 1 except that the block 33 is precluded as this is not required because the opposed tape edges 13 at the bottom end of the fastener 10 are brought together in abutting relation to each other as better shown in FIGS. 8a and 8b.

Each of the molds 31, 32 is provided around its inner periphery below the support pin 38 with a recess 40 for forming a peripheral fin 41 which serves to reinforce the bond of the end stop 22, (22') to the tape web 12'.

Figure 10:
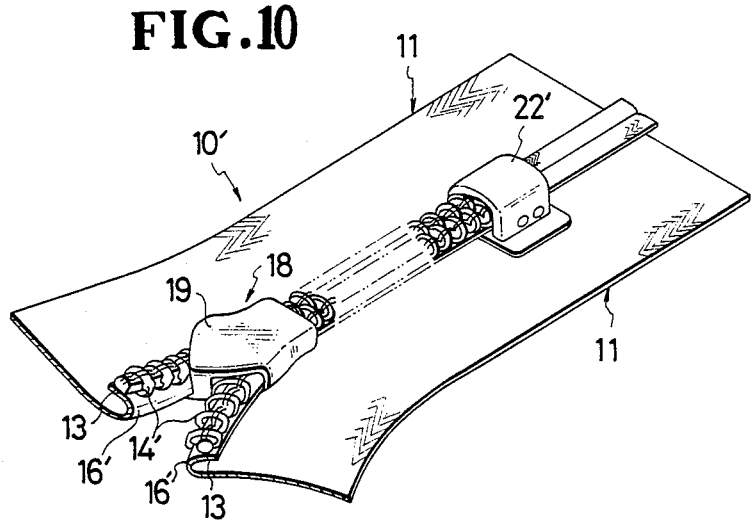
FIG. 10 is a fragmentary perspective view of a bottom end portion of a concealed slide fastener to which a bottom stop has been injection molded.
Figure 11:
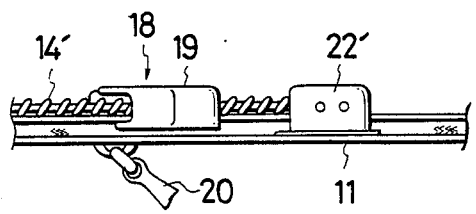
FIG. 11 is a slide elevational view of the concealed slide fastener, with a slider being pulling all the way to the bottom end stop.
Figure 13:
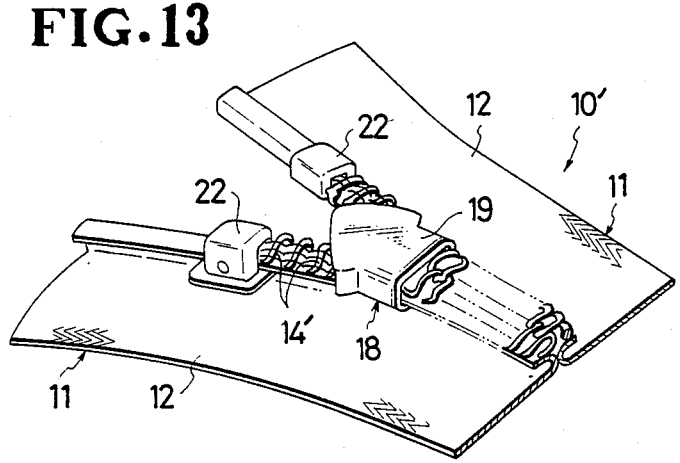
FIG. 13 is a fragmentary perspective view of a top end portion of the concealed slide fastener to which a pair of top end stops have been injection molded.

FIGS. 10, 11 and 13 show a concealed slide fastener 10' including a pair of stringers 11, 11. Each stringer 11 includes a support tape 12 carrying on and along its inner longitudinal edges 13 a row of coupling elements 14' in the form of continuous coiled filament. Alternatively, the coupling elements 14' may be discrete. The support tape 12 may be a woven or knit fabric.

The tape edge 13 to which the row of coupling elements 14' is secured is folded to provide an abutment 16' engageable with the corresponding abutment of the tape edge 13 of the companion stringer 11 to conceal the opposed rows of coupling elements 14', 14' from the under side (FIGS. 10 and 13) when the slide fastener 10' is closed, in a manner well known in the art.

The movement of a slider 18 is limited or stopped at opposite ends of the slide fastener 10' by a bottom end stop 22' and a pair of top end stops 22, 22, as shown in FIG. 11. Each end stop 22', 22 is applied to the tape edge 13 by injection molding in accordance with the invention.

Figure 12:
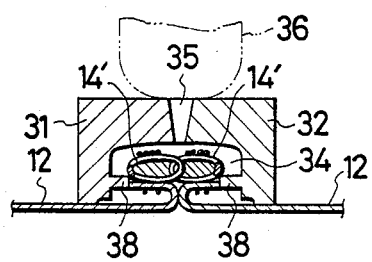
FIG. 12 shows the manner in which the bottom end stop is injection molded.
Figure 14:
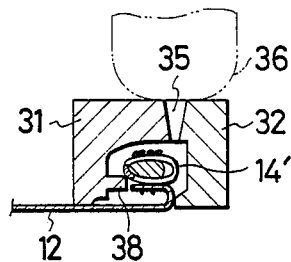
FIG. 14 shows the manner in which one of the top end stop is injection molded on the respective tape.

Since the row of coupling element 14' is supported on the folded tape edge 13 as floating from the general plane of the tape 12, it is necessary to support the row of coupling elements 14' by the support pins 38, while the end stop or stops 22, 22' are injection molded, as shown in FIGS. 12 and 14.

FIG. 12 illustrates the manner in which the bottom end stop 22' is injection molded as each row of coupling elements 14' is supported by the respective support pin 38. The top end stops 22, 22 are injection molded separately, as shown in FIG. 14 in which the molding of only one top end stop 22 is illustrated for clarity.

There may be conceived many other changes or modifications in the specific embodiments discussed hereinabove, as appear apparent to those skilled in the art.

What is claimed is:

1. A method of applying end stop members by injection molding to a slide fastener having a pair of stringer tapes, each carrying along its inner longitudinal edge a row of coupling elements, each of said coupling elements include a head and a heel portion and said inner longitudinal edge being folded relative to said tape, said method comprising:

(a) supporting the length of said folded inner longitudinal edge in a position substantially perpendicular to the plane of the tape by disposing said heel portion of at least one coupling element in a recess in a support pin prior to and during formation of an end stop;

(b) injecting an end stop forming material to flow in a direction opposite to the position in which said inner longitudinal edge is supported; and (c) molding an end stop in place on a predetermined length of said inner longitudinal edge while maintaining alignment with its neighboring edge portion of the tape outside the end stop.

* * * * *